Aug. 30, 1932.  G. F. MICHAEL  1,875,092
BRAKE
Filed April 21, 1928
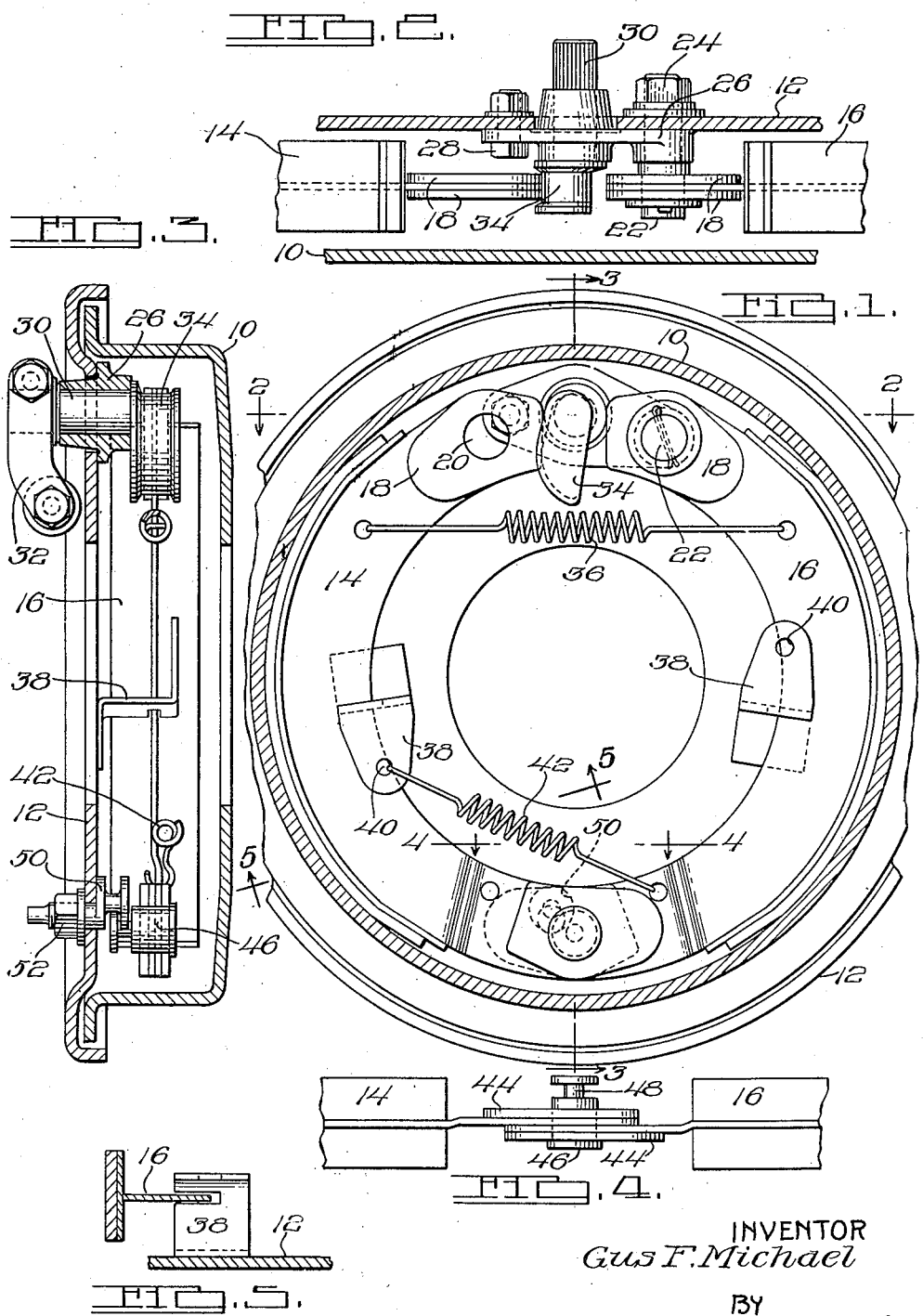
INVENTOR
*Gus F. Michael*
BY
*M. N. McConkey*
ATTORNEY Patented Aug. 30, 1932

1,875,092

UNITED STATES PATENT OFFICE

GUS F. MICHAEL, OF SOUTH BEND, INDIANA, ASSIGNOR TO BENDIX BRAKE COMPANY, OF SOUTH BEND, INDIANA, A CORPORATION OF ILLINOIS

BRAKE

Application filed April 21, 1928. Serial No. 271,689.

This invention relates to brakes and is illustrated as embodied in an internal expanding brake for an automobile. An object of the invention is to simplify and lessen the cost of manufacture of a brake of the type in which an anchored shoe is applied by a floating servo shoe. Another object of the invention is to provide a brake having a highly desirable means for connecting the shoes of the brake.

A further object of the invention is to provide a brake having an inexpensive steady rest for the shoes of the brake. Various features of novelty relate to making the two shoes interchangeable, to provide a simplified cam and anchor mounting therefor, and to various other novel and desirable details of construction which will be apparent from the following description of the illustrative embodiment shown in the accompanying drawing, in which:

Figure 1 is a vertical section through the brake just inside the head of the brake drum and showing the brake shoes in side elevation;

Figure 2 is a partial section through the brake on the line 2—2 of Figure 1 and showing the operating and anchoring means;

Figure 3 is a vertical diametric section through the brake on the line 3—3 of Figure 1;

Figure 4 is a view of the pivot connection between the shoes looking in the direction of the arrows 4—4 of Figure 1; and Figure 5 is a section showing a novel steady rest for the shoes and taken on the line 5—5 of Figure 1.

The illustrated brake includes the usual rotatable drum 10 at the open side of which there is a stationary support such as a backing plate 12 and within which is arranged the friction means of the brake. The friction means as shown includes a pair of interchangeable T-section brake shoes 14 and 16. Each of the shoes is reinforced at its upper end with a pair of steel stampings 18 projection-welded to its opposite sides, the two stampings 18 and the web of the shoe being formed with aligned openings 20 which in the case of the shoe 16 are mounted on a fixed anchor pivot 22 clamped by means such as a nut 24 in a bracket 26 secured to the backing plate 12 by the anchor pivot 22 and its nut 24, together with a bolt 28 at the other end of the bracket.

The central portion of the bracket 26 is formed as a bearing for a cam shaft 30 operated by a suitable lever 32 and formed as an integral forging with a cam 34 acting on the end of the shoe 14. The cam 34 is preferably grooved to form side flanges embracing the end of the shoe 14 to hold it against lateral movement. The cam 34 applies the shoe 14 against the resistance of a coil spring 36 tensioned between the shoes 14 and 16.

The shoes 14 and 16 are shown positioned laterally by steady rests in the form of steel stampings 38 having bases turned at right angles and welded or otherwise secured to the backing plate 12 and having portions at right angles to the plane of the backing plate which are notched to embrace the webs of the brake shoes. This part of the steady rest 38 is substantially as more fully described and as claimed in application No. 266,505 filed Apr. 2, 1928. I prefer to continue the steady rest 38 with another flange extending parallel to the backing plate in the opposite direction from the base of the steady rest and formed with an opening 40 for the attachment of an auxiliary return spring 42 against the resistance of which the shoe 16 is applied by the shoe 14.

At their lower ends the webs of the shoes 14 and 16 are offset from the central plane of the brake so that they lie side by side, the offset portions preferably being reinforced by plates 44 projection-welded to their sides, and the overlapping ends of the shoes being connected by a pivot 46 extending through openings formed therein and formed at the end adjacent the backing plate with a groove 48 to receive a suitable stop such as an adjustable eccentric 50 against which the pivot 46 is urged by the spring 42. As shown in Figure 3, the eccentric 50 may be clamped in any desired adjusted position by means such as a nut 52.

While one illustrative embodiment of my invention has been described in detail, it is not my intention to limit the scope of the invention to that particular embodiment or otherwise than by the terms of the appended claims.

I claim:

1. A brake comprising, in combination, a pair of interchangeable brake shoes having centrally arranged stiffening webs offset in opposite directions at their adjacent ends and arranged to overlap, together with a pivot connecting the overlapping portions of said webs.

2. A brake comprising, in combination, a shoe having a stiffening web, a steady rest including a stamping notched to embrace said web and having a flange extending at right angles thereto, and a tensioned return spring connected to said flange.

3. A brake comprising, in combination a pair of brake shoes having centrally arranged stiffening webs offset from the plane of the webs at their adjacent ends, said offset portions overlapping and reinforced by plates on opposite sides of said overlapped portions, together with a pivot pin passing through and connecting said overlapped portions and reinforcing plates.

4. A brake comprising interchangeable pivotally-connected shoes both formed at their unconnected ends for engagement with an applying device and to be journaled upon a fixed anchor pivot, in combination with a fixed anchor pivot on which one shoe is journaled and an applying device acting on the other shoe.

5. A steady rest for a brake comprising a stamping notched to embrace the web of a brake shoe and having a base to be secured to a non-rotating part of the brake and having an extension paralleling the base on the side opposite the web and which is formed for attachment of a brake return spring.

In testimony whereof, I have hereunto signed my name.

GUS F. MICHAEL.